United States Patent
Gundlach et al.

(10) Patent No.: US 10,762,762 B2
(45) Date of Patent: Sep. 1, 2020

(54) INVENTORY SYSTEMS WITH SENSOR-DRIVEN TAG READ POINTS

(71) Applicants: Chad M. Gundlach, Ladera Ranch, CA (US); Neil M. Reyes, Laguna Hills, CA (US); Tamlyn J. Jones, Rancho Mission Viejo, CA (US)

(72) Inventors: Chad M. Gundlach, Ladera Ranch, CA (US); Neil M. Reyes, Laguna Hills, CA (US); Tamlyn J. Jones, Rancho Mission Viejo, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/459,676

(22) Filed: Jul. 2, 2019

(65) Prior Publication Data
US 2020/0013270 A1    Jan. 9, 2020

Related U.S. Application Data

(60) Provisional application No. 62/693,582, filed on Jul. 3, 2018.

(51) Int. Cl.
*G08B 13/14* (2006.01)
*G08B 21/02* (2006.01)

(52) U.S. Cl.
CPC .................. *G08B 21/0275* (2013.01)

(58) Field of Classification Search
CPC .......... G08B 21/0275; G06K 7/10128; G06K 7/10118
USPC ...................................... 340/572.1
See application file for complete search history.

(56) References Cited

U.S. PATENT DOCUMENTS

| | | | |
|---|---|---|---|
| 2007/0273484 A1* | 11/2007 | Cederlof | H04W 12/0401 340/10.33 |
| 2013/0217342 A1 | 8/2013 | Abdul-Gaffoor et al. | |
| 2014/0232519 A1* | 8/2014 | Allen | G06Q 10/08 340/5.9 |
| 2015/0091705 A1* | 4/2015 | Banegas | G06K 17/0022 340/10.6 |

FOREIGN PATENT DOCUMENTS

| | | |
|---|---|---|
| EP | 1793326 A2 | 6/2007 |
| EP | 2286520 A1 | 2/2011 |

* cited by examiner

*Primary Examiner* — Tanmay K Shah
(74) *Attorney, Agent, or Firm* — Arent Fox LLP

(57) ABSTRACT

Systems and methods for operating a reader. The methods comprise: supplying power from the reader to an external sensor using a single cable that (A) connects the reader to both an external antenna and the external sensor and (B) is used for data communications between the reader, the external antenna and the external sensor; receiving, by the reader via the single cable, a sensor signal comprising information indicating the external sensor's detection of an individual's presence in proximity thereto, where the sensor signal has a frequency that is outside the antenna's transmit frequency; initiating tag read operations of the reader in response to the sensor information's reception at the reader; and communicating an interrogation signal for tag reading from the reader to the external antenna via the single cable, where the interrogation signal has a frequency which is outside the external sensor's receive frequency band.

21 Claims, 7 Drawing Sheets

INVENTORY SYSTEMS WITH SENSOR-DRIVEN TAG READ POINTS

CROSS REFERENCE TO RELATED APPLICATION

This application claims priority to U.S. Provisional Patent Application No. 62/693,582, filed on Jul. 3, 2018. The contents of which are incorporated herein by reference in its entirety.

BACKGROUND

Statement of the Technical Field

The present disclosure relates generally to inventory systems. More particularly, the present disclosure relates to inventory systems having sensor-driven tag read points.

Description of the Related Art

A typical EAS system in a retail setting may comprise a monitoring system and at least one security tag or marker attached to an article to be protected from unauthorized removal. The monitoring system establishes a surveillance zone in which the presence of security tags and/or markers can be detected. The surveillance zone is usually established at an access point for the controlled area (e.g., adjacent to a retail store entrance and/or exit). If an article enters the surveillance zone with an active security tag and/or marker, then an alarm may be triggered to indicate possible unauthorized removal thereof from the controlled area. In contrast, if an article is authorized for removal from the controlled area, then the security tag and/or marker thereof can be detached therefrom. Consequently, the article can be carried through the surveillance zone without being detected by the monitoring system and/or without triggering the alarm.

Radio Frequency Identification ("RFID") systems may also be used in a retail setting for inventory management and related security applications. In an RFID system, a reader transmits a Radio Frequency ("RF") carrier signal to an RFID device. The RFID device responds to the carrier signal with a data signal encoded with information stored by the RFID device. Increasingly, passive RFID labels are used in combination with EAS labels in retail applications.

As is known in the art, security tags for security and/or inventory systems can be constructed in any number of configurations. The desired configuration of the security tag is often dictated by the nature of the article to be protected. For example, EAS and/or RFID labels may be enclosed in a rigid tag housing, which can be secured to the monitored object (e.g., a piece of clothing in a retail store). The rigid housing typically includes a removable pin which is inserted through the fabric and secured in place on the opposite side by a mechanism disposed within the rigid housing. The housing cannot be removed from the clothing without destroying the housing except by using a dedicated removal device.

SUMMARY

The present document concerns systems and methods for operating a reader. The methods comprise: supplying power from the reader to an external sensor using a single cable that (A) connects the reader to both an external antenna and the external sensor and (B) is used for data communications between the reader, the external antenna and the external sensor; receiving, by the reader via the single cable, a sensor signal comprising information indicating the external sensor's detection of an individual's presence in proximity thereto, where the sensor signal has a frequency that is outside the antenna's transmit frequency; initiating tag read operations of the reader in response to the sensor information's reception at the reader; and communicating an interrogation signal for tag reading from the reader to the external antenna via the single cable, where the interrogation signal has a frequency which is outside the external sensor's receive frequency band.

In some scenarios, the reader is 1-Wire enabled and communicates with the external sensor and the external antenna via a 1-Wire protocol. The external sensor may be disposed in the same housing as the external antenna. The reader may perform operations to control or program the sensor using the single cable.

In those or other scenarios, the methods also comprise dynamically selecting a value for at least one transceiver parameter of the reader in response to the sensor information's reception at the reader. The value may be dynamically selected prior to interrogation signals communication from the reader. The transceiver parameter may include, but is not limited to, a transmit power parameter, a transmit frequency parameter, and/or a receive signal strength threshold parameter.

In those or other scenarios, the reader receives, via the single cable, a response signal from at least one tag. The response signal has a frequency which is outside the external sensor's receive frequency band. The tag has at least one of an RFID capability and an EAS capability.

BRIEF DESCRIPTION OF THE DRAWINGS

The present solution will be described with reference to the following drawing figures, in which like numerals represent like items throughout the figures.

DETAILED DESCRIPTION

Figure 1:
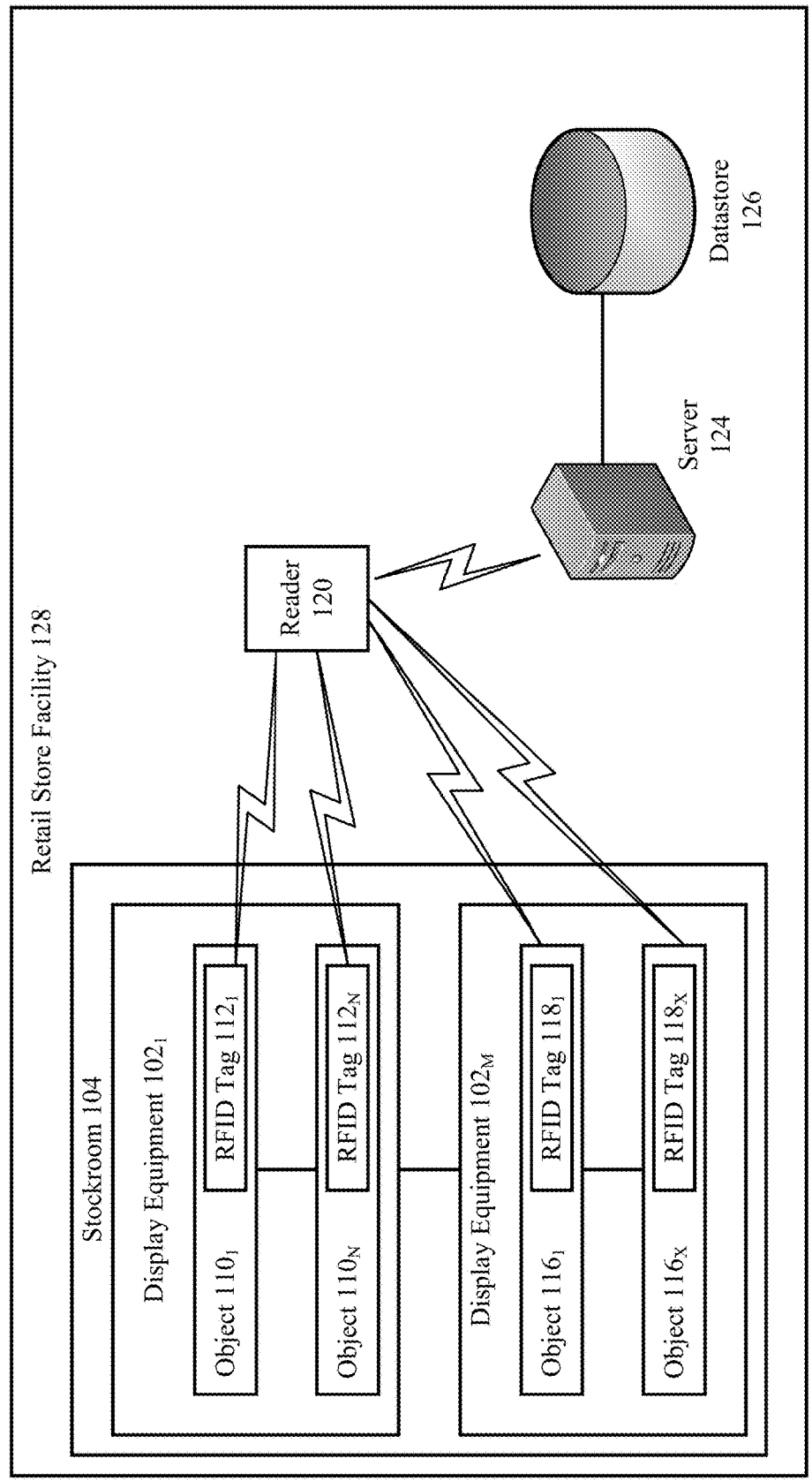
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In an RFID environment with large quantities of stray and/or static tags, reading of new RFID tags is challenging due to the quantity of tags seen affecting one's ability to isolate new tags of interest. An example of this scenario would be a transition solution in which a reader is reading static tags in a stockroom when new tags are being received or transferred to the sales floor. For example, a stockroom contains 2000 tags and new shipment of 500 items is received through the receiving door. A reader is configured in receiving mode to read the new tags being received. However, due to the 2000 stray tags in view, the reader has a hard time isolating the 500 new tags entering the environment.

The ability to isolate tags in a read-point solution is solved in some scenarios by utilizing a human-presence sensor (such as a Passive Infrared ("PIR") sensor) controlled over proprietary RF-enabled 1-Wire protocol. 1-Wire is a device communications bus system that provides low speed data, signaling, and power over a single conductor. This human-presence sensor can be embedded in a 1-Wire controlled RF antenna. The sensor will be controlled and/or powered over 1-Wire by a 1-Wire enabled RFID reader. Alternatively, the human-presence sensor is a separate device, but connected to a 1-Wire controlled RF antenna. The human-presence sensor will be controlled and/or powered over 1-Wire by a 1-Wire enabled RFID reader. The presence of a human triggers the sensor, which causes the 1-Wire enabled RFID reader to enter a new state to facilitate the identification of new tags entering the read area.

Illustrative System

Referring now to FIG. 1, there is provided an illustration of an illustrative system 100. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow improved item detection within a facility. As shown in FIG. 1, system 100 comprises a Retail Store Facility ("RSF") 128 in which display equipment $102_1, \ldots, 102_M$ (collectively referred to as 102) is disposed. The display equipment is provided for displaying and/or storing objects (or items) $110_1$-$110_N$ (collectively referred to as 110), $116_1$-$116_X$ (collectively referred to as 116) in a stockroom 104. The display equipment can include, but is not limited to, shelves and/or cabinets.

At least one reader 120 is provided to assist in detecting objects $110_1$-$110_N$, $116_1$-$116_X$ located within, entering and/or leaving the stockroom 104. The reader 120 is a stationary reader disposed at a read point of the RSF 128. For example, the reader 120 is located at an entrance/exit of the stockroom 104. The present solution is not limited in this regard.

As shown in FIG. 1, RFID tags $112_1$-$112_N$ (collectively referred to as 112), $118_1$-$118_X$ (collectively referred to as 118) are respectively attached or coupled to the objects $110_1$-$110_N$, $116_1$-$116_X$ (e.g., pieces of clothing or other merchandise). The reader 120 is generally configured to read RFID tags $112_1, \ldots, 112_N$, $118_1, \ldots, 118_X$. The RFID tags are described herein as comprising single-technology tags that are only RFID enabled. The present solution is not limited in this regard. The RFID tags can alternatively or additionally comprise dual-technology tags that have both Electronic Article Surveillance ("EAS") and RFID capabilities.

The tag reads are useful for determining a current inventory of the RSF 128. Accordingly, RFID tag identification information, RFID tag read time information, reader identification information, reader location information, and/or stockroom identification information is stored in a datastore 126 so as to be associated with each other. This information can be stored in the datastore 126 using a server 124. Server 124 will be described in more detail below in relation to FIG. 7.

Figure 2:
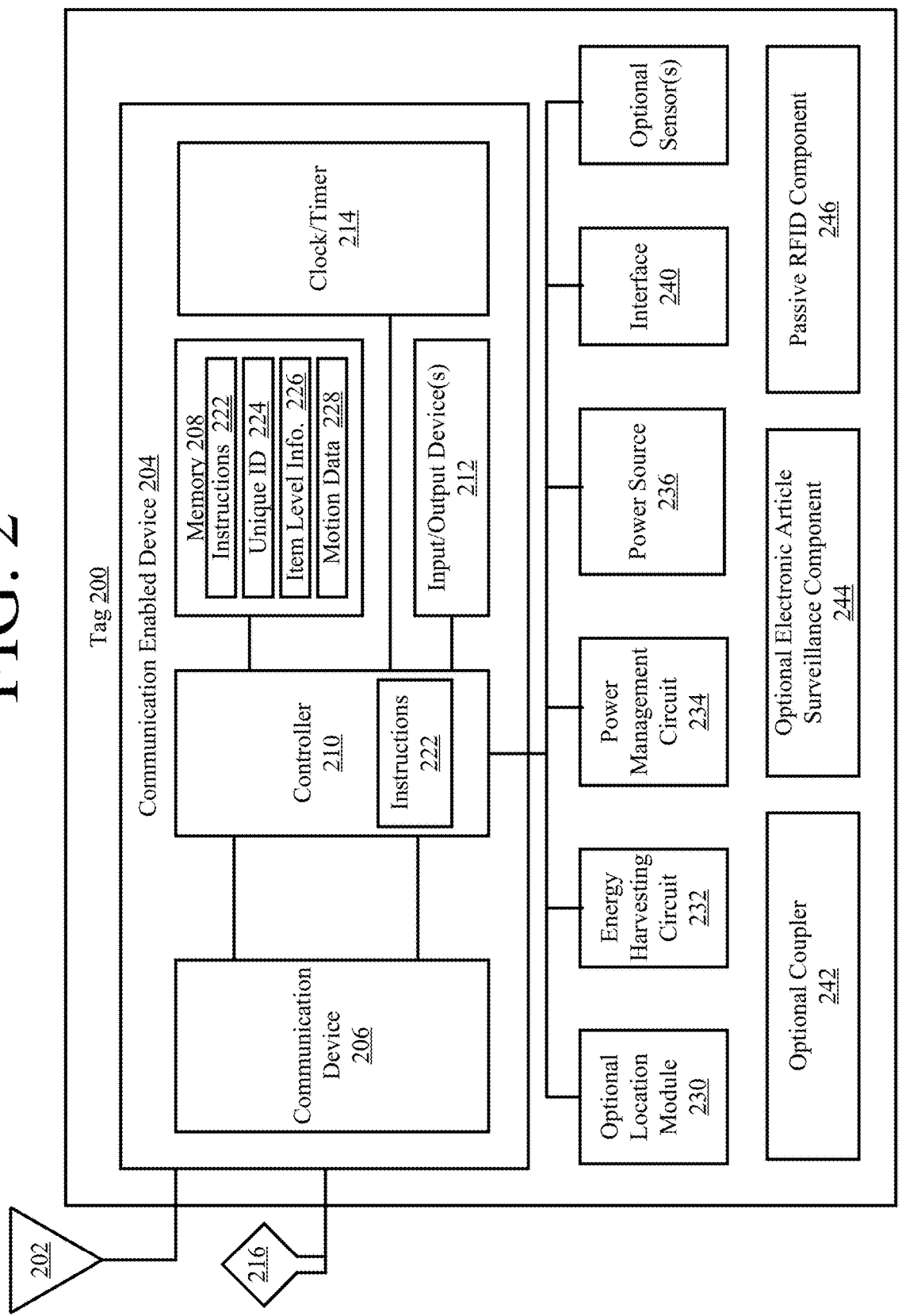
FIG. 2 is an illustration of an illustrative tag.

Referring now to FIG. 2, there is an illustration of an illustrative architecture for a tag 200. RFID tags $112_1, \ldots, 112_N$, $118_1, \ldots, 118_X$ of FIG. 1 are the same as or similar to tag 200. As such, the discussion of tag 200 is sufficient for understanding the RFID tags $112_1, \ldots, 112_N$, $118_1, \ldots, 118_X$ of FIG. 1.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management. In this regard, the tag 200 is configured for allowing data to be exchanged with an external device (e.g., tag reader 120 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology and/or a SRC technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 (e.g., an EPC) can be stored in memory 208 of the communication enabled device 204 and/or communicated to other external devices (e.g., tag reader 120 of FIG. 1 and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to securely or removably couple the tag 200 to an item (e.g., object 110 or 116 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

Figure 3:
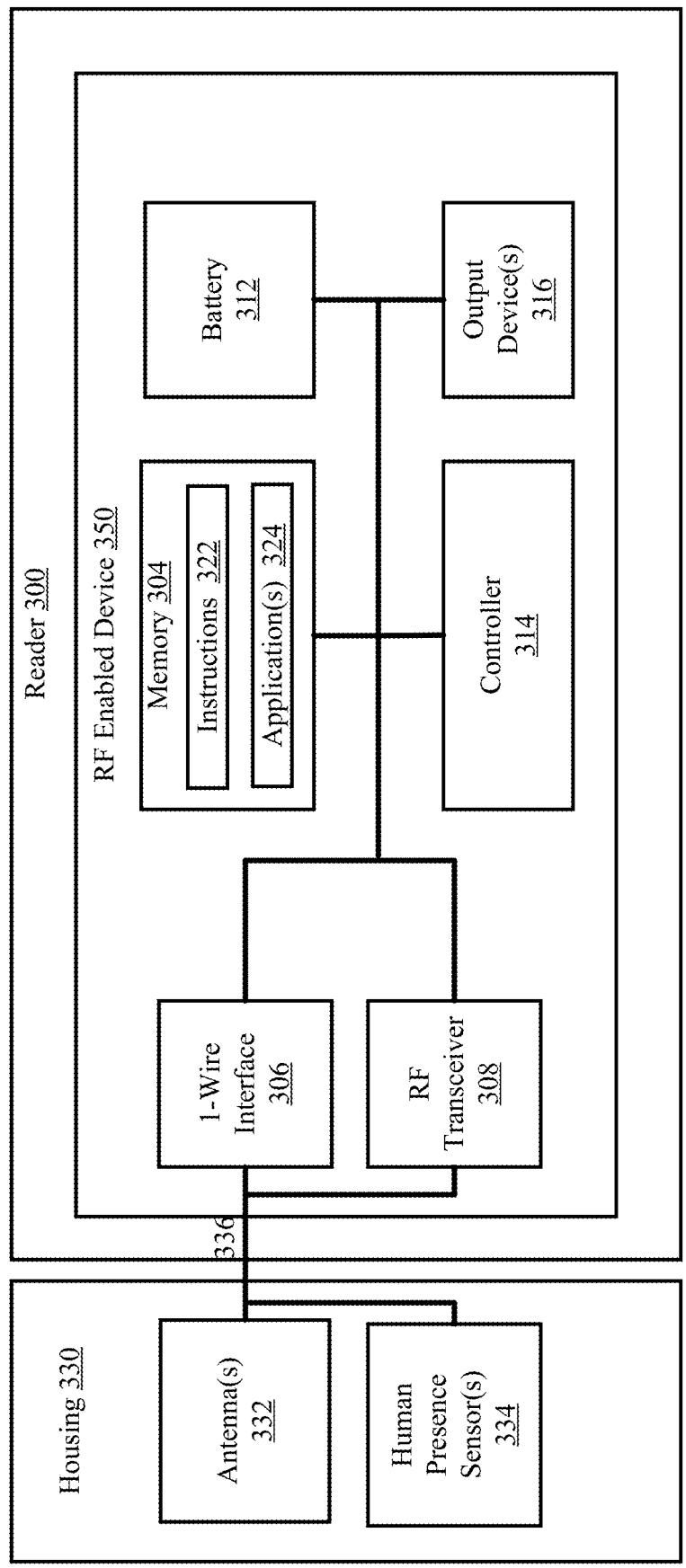
FIG. 3 is an illustration of an illustrative reader.

Referring now to FIG. 3, there is provided a detailed block diagram of an illustrative reader (or tag reader) 300. Tag reader 120 of FIG. 1 is the same as or similar to reader 300. As such, the discussion of reader 300 is sufficient for understanding tag reader 120.

Reader 300 may include more or less components than that shown in FIG. 3. However, the components shown are sufficient to disclose an illustrative embodiment implementing the present solution. Some or all of the components of the reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an embodiment of a representative reader 300 configured to facilitate improved inventory management within an RSF (e.g., RSF 128 of FIG. 1). In this regard, the reader 300 comprises an RF enabled device 350 for allowing data to be exchanged with an external device (e.g., RFID tags 112, 118 of FIG. 1) via RF technology. The components 304-316 shown in FIG. 3 may be collectively referred to herein as the RF enabled device 350, and include a power source 312 (e.g., a battery).

The RF enabled device 350 is coupled to one or more antennas 332 for allowing data to be exchanged with the external device via RF technology (e.g., RFID technology or other RF based technology). The external device may comprise RFID tags 112, 118 of FIG. 1. In this case, the antenna(s) 332 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a controller 314 for extracting the information therefrom. The extracted information can be used to determine an inventory of an RSF (e.g., RSF 128 of FIG. 1). Accordingly, the extracted information is stored in memory 304.

Memory 304 may be a volatile memory and/or a non-volatile memory. For example, the memory 304 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to where RFID tags are located within a facility. Other functions of the RF enabled device 350 will become apparent as the discussion progresses.

The RF enabled device 350 is 1-Wire enabled. As such, the RF enabled device 350 comprises a 1-Wire interface 306 through which external component(s) 334 can be supplied power and/or controlled via a 1-Wire protocol. The 1-Wire protocol and interface are well known in the art, and therefore will not be described herein. Still, it should be appreciated that a single wire or cable 336 (e.g., an RF coaxial cable or 1-Wire bus) is used for (A) data communications between the reader 300 and external components 332, 334 and/or (B) the supply of power from the reader 300 to the external components 332, 334. The external components include antenna(s) 332 and human presence sensor(s) 334. Notably, the antenna(s) 332 will not radiate the data communications having a 1-Wire protocol format, only those having an RF protocol format. The human presence sensor(s) 334 will not receive the RF data communications sent over the single wire or cable since these communications have a frequency which is outside the sensor's receive frequency band.

The human presence sensor 334 is generally configured to detect when a person is in proximity to the reader 300. The human presence sensor 334 can include, but is not limited to, a Passive Infrared ("PIR") sensor. PIR sensors are well known in the art, and therefore will not be described herein. Any known or to be known PIR sensor can be used herein without limitation. The human presence sensor 334 is controlled and/or powered via the RF enabled device 350.

Figure 4:
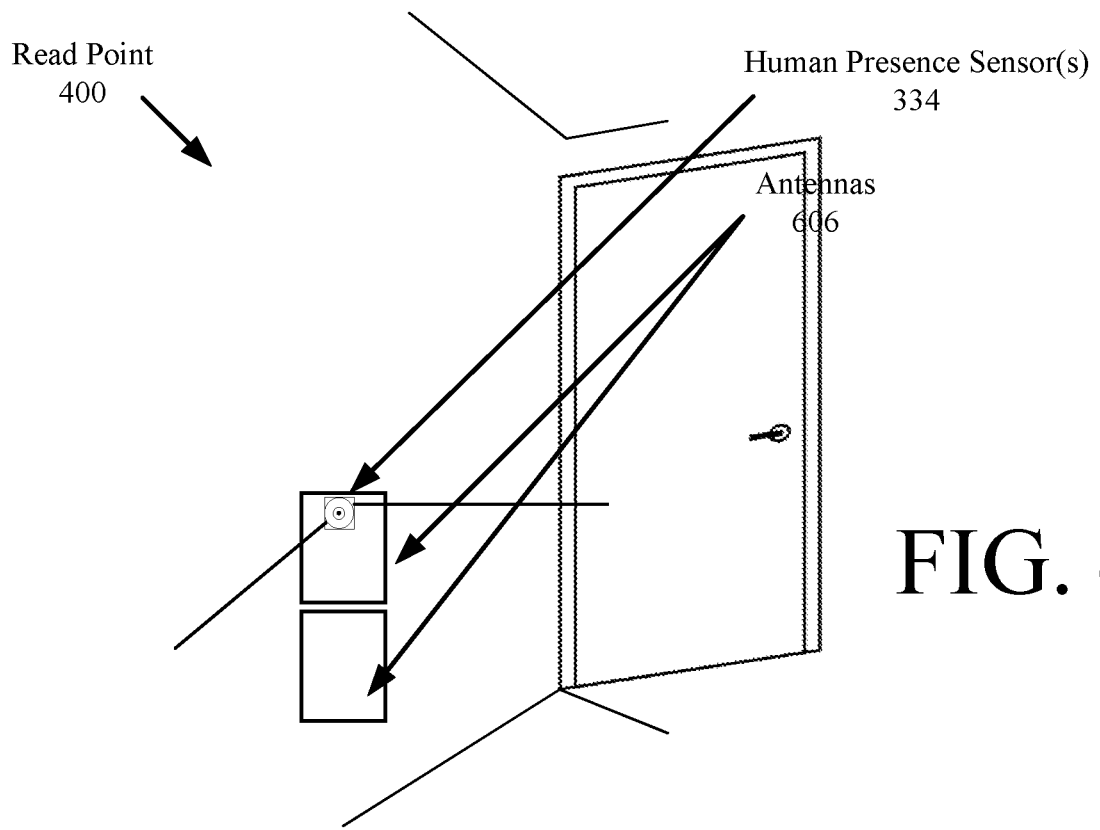
FIG. 4 is an illustration of a read point with a human presence sensor and antennas.
Figure 5:
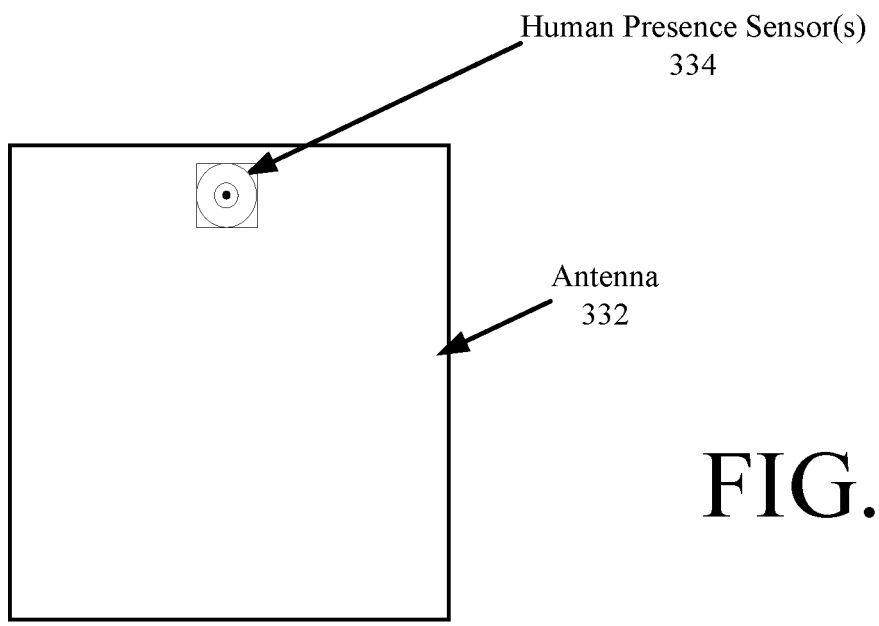
FIG. 5 is an illustration of a human presence sensor disposed in the same housing as an antenna of a reader.

In some scenarios, the human presence sensor 334 is embedded in the same housing 330 as the antenna(s) 332. Illustrations showing this configuration are provided in FIGS. 4-5. As shown in FIGS. 4-5, the housing is configured to be mounted in a wall (e.g., a wall at a read point 400).

Figure 6:
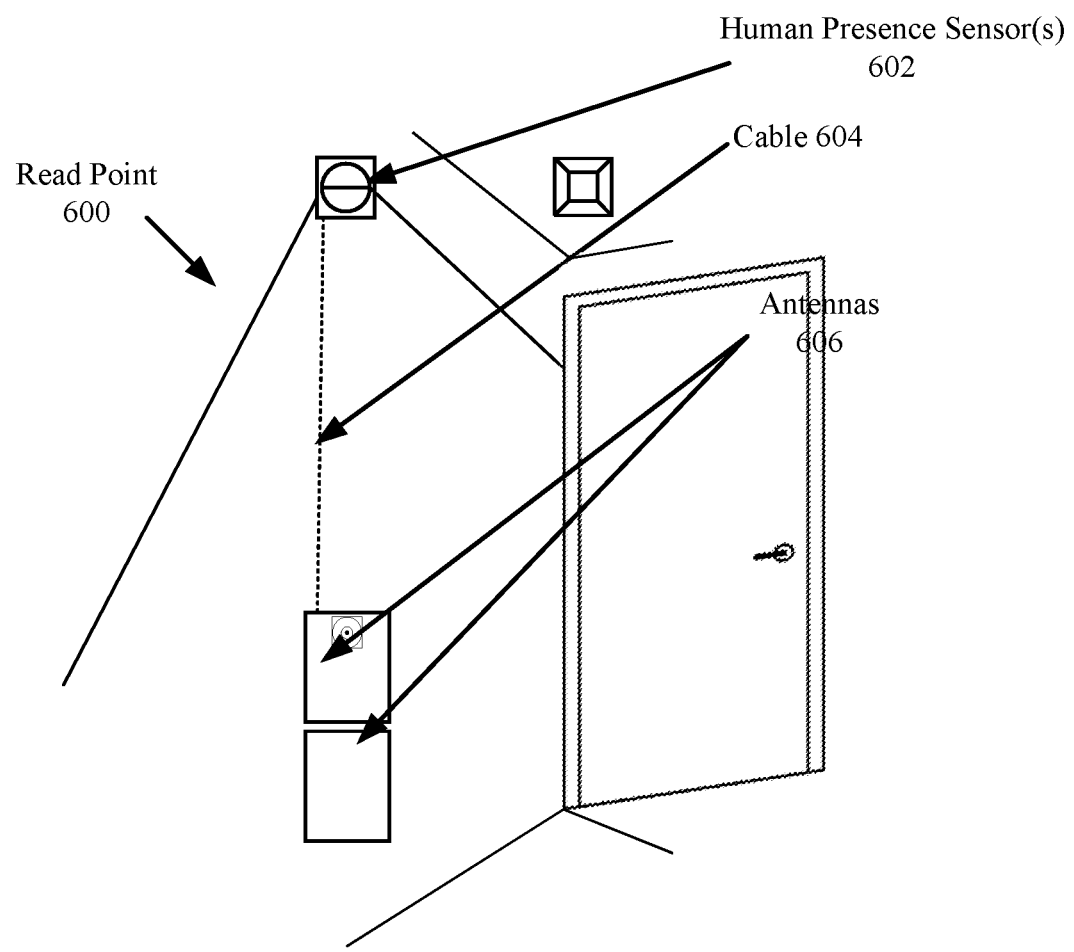
FIG. 6 is an illustration of a read point with a human presence sensor coupled to antennas of a reader via a cable.

In other scenarios, the human presence sensor is separated from the antenna(s). An illustration showing this configuration is provided in FIG. 6. As shown in FIG. 6, a human presence sensor 602 is coupled to a wall at a read point 600 so as to be located above the antennas 606. A cable 604 is provided to connect the human presence sensor 602 to the antennas 606.

During operation, the detection of an individual in proximity to the reader 300 is used to trigger certain operations of the reader 300. The triggered reader operations have many advantages, such as power saving and improved inventory accuracy. In some scenarios, tag read operations of the reader 300 are initiated by the controller 314 in response to the human presence sensor's detection of the individual. Values for RF transceiver parameters may also be dynamically selected based on sensor data received from the human presence sensor 334. These RF transceiver parameters include, but are not limited to, a transmit power parameter, a transmit frequency parameter, and a receive signal strength threshold parameter. The RF transceiver parameters are then set to the dynamically selected values prior to the performance of the tag read operations triggered by the detection of the individual's presence. The present solution is not limited to the particulars of this example. Additionally or alternatively, a detection of the individual's presence can trigger an operational mode change of the reader 300, e.g., an operational mode of the reader is transitioned from a first operational mode in which tag read operations are not being performed to a second operational mode in which tag read operations are being performed. Also, values for any of the parameters listed in a Class 1, Gen 2 RFID specification for RFID tags can be dynamically selected and set in response to the human presence sensor's detection of an individual in proximity thereto.

The present solution is not limited to the above described reader architecture. For example, protocols other than the 1-Wire protocol can be used to communicate information between the RFID enabled device 350 and the human presence sensor 334. The other protocols can include, but are not limited to, an Ethernet protocol and a General Purpose Input/Output ("GPIO") protocol.

Figure 7:
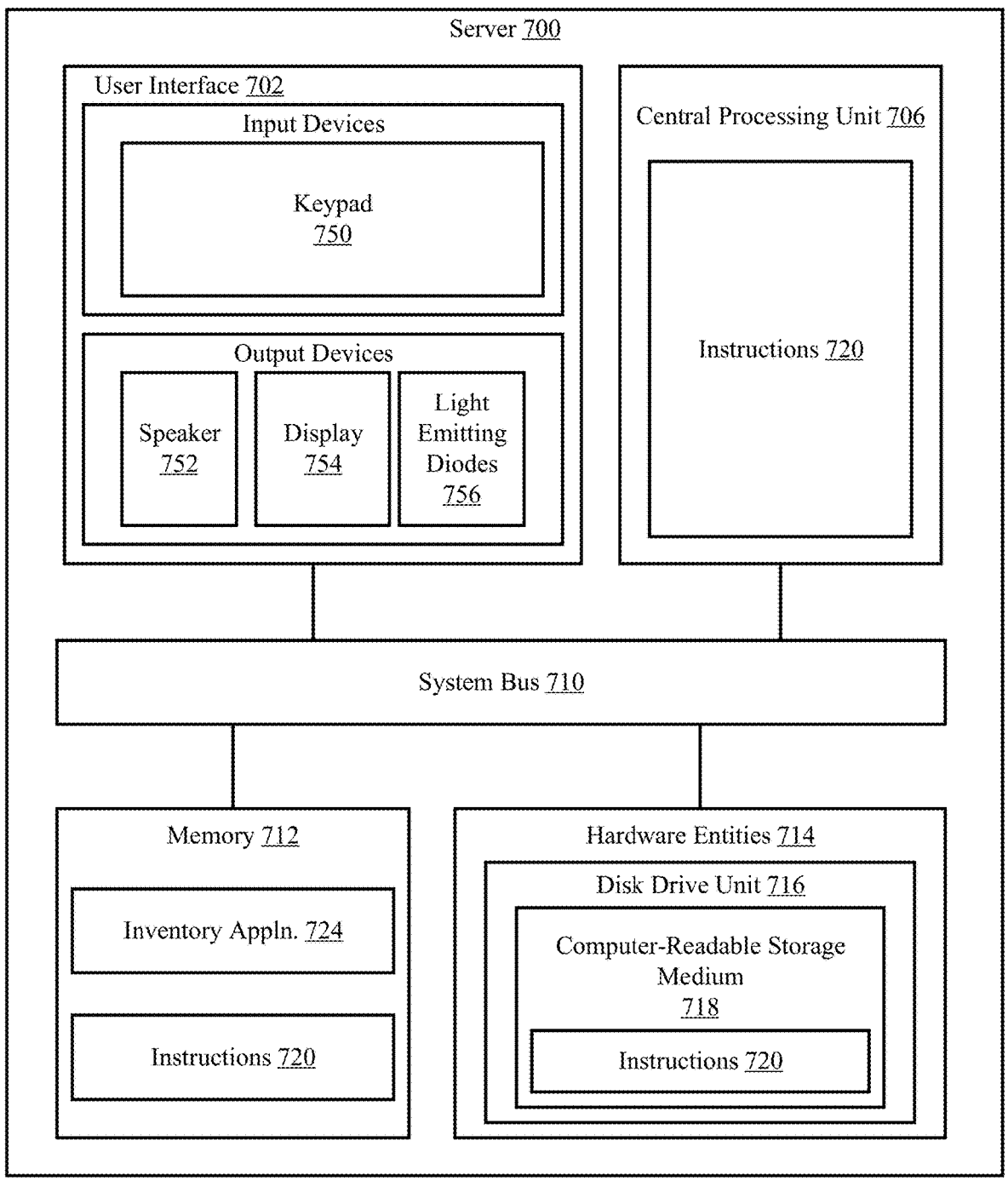
FIG. 7 is an illustration of an illustrative server.

Referring now to FIG. 7, there is provided an illustration of an illustrative server 700. Server 124 of FIG. 1 is the same as or similar to server 700. As such, the discussion of server 700 is sufficient for understanding server 124 of FIG. 1.

Server 700 may include more or less components than those shown in FIG. 7. However, the components shown are sufficient to disclose an illustrative embodiment implementing the present solution. The hardware architecture of FIG. 4 represents one embodiment of a representative server configured to facilitate (a) tag location determinations, (b) tag location confidence value computations, and/or (c) the provision of a three dimensional map showing locations of RFID tags (e.g., RFID tags 112, 118 of FIG. 1) within an RSF (e.g., RSF 128 of FIG. 1). As such, the server 700 of FIG. 7 implements at least a portion of the methods described herein.

Some or all the components of the server 700 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 7, the server 700 comprises a user interface 702, a Central Processing Unit ("CPU") 706, a system bus 710, a memory 712 connected to and accessible by other portions of server 700 through system bus 710, and hardware entities 714 connected to system bus 710. The user interface can include input devices (e.g., a keypad 750) and output devices (e.g., speaker 752, a display 754, and/or light emitting diodes 756), which facilitate user-software interactions for controlling operations of the server 700.

At least some of the hardware entities 714 perform actions involving access to and use of memory 712, which can be a RAM, a disk driver and/or a Compact Disc Read Only Memory ("CD-ROM"). Hardware entities 714 can include a disk drive unit 716 comprising a computer-readable storage medium 718 on which is stored one or more sets of instructions 720 (e.g., software code) configured to implement one or more of the methodologies, procedures, or functions described herein. The instructions 720 can also reside, completely or at least partially, within the memory 712 and/or within the CPU 706 during execution thereof by the server 700. The memory 712 and the CPU 706 also can constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the server 700 and that cause the server 700 to perform any one or more of the methodologies of the present disclosure.

In some scenarios, the hardware entities 714 include an electronic circuit (e.g., a processor) programmed for facilitating the determination of an inventory within a facility. In this regard, it should be understood that the electronic circuit can access and run an inventory application 724 installed on the server 700. The software application 724 is generally operative to facilitate: the storage of tag read related information in a datastore (e.g., datastore 126 of FIG. 1); and the processing of tag read related information for determining a current inventory of the facility. Other functions of the software application 724 will become apparent as the discussion progresses.

Illustrative Method for Synchronizing Incompatible Systems

Figure 8:
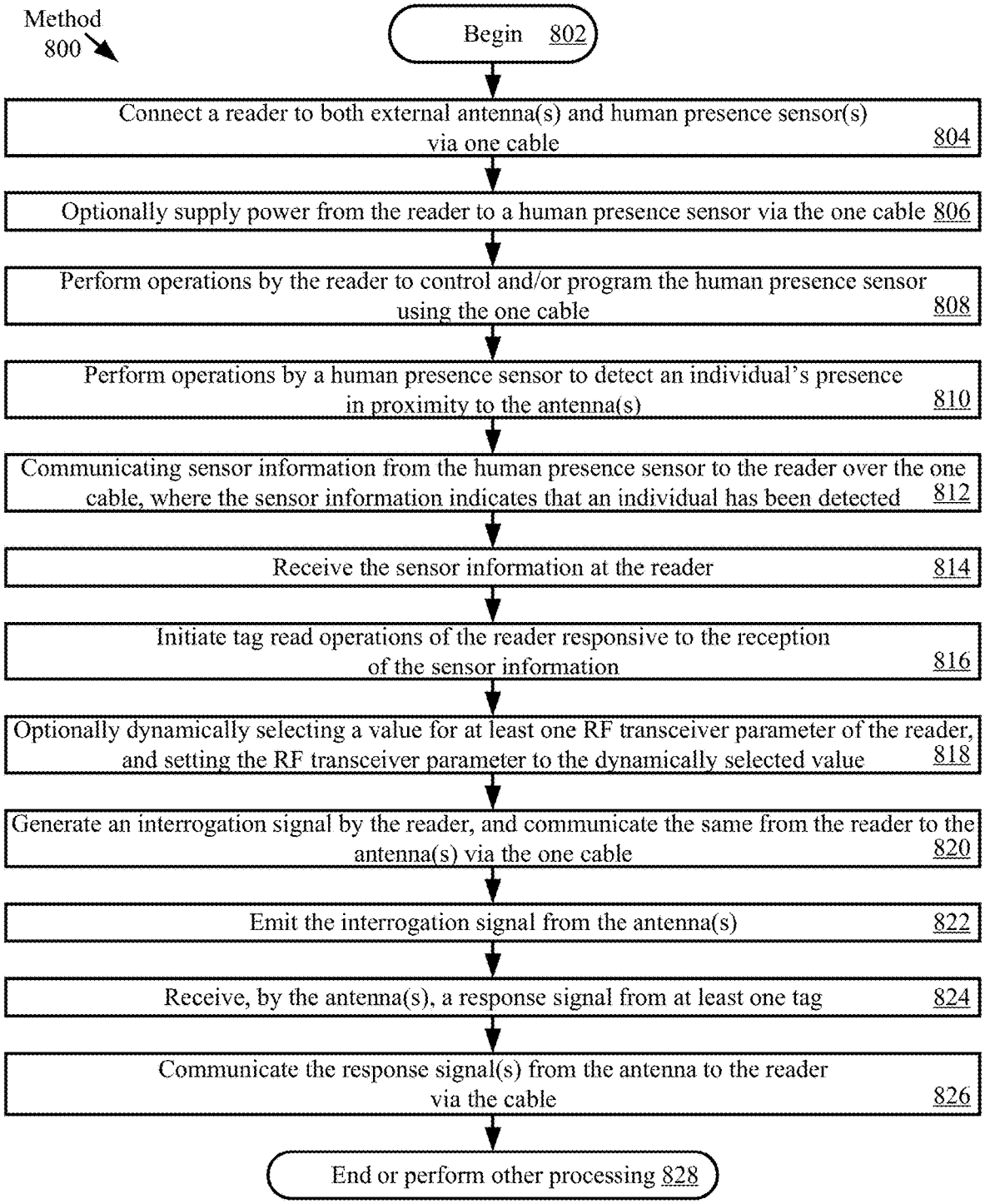
FIG. 8 is a flow diagram of an illustrative method for operating a reader.

Referring now to FIG. 8, there is provided a flow diagram of an illustrative method 800 for operating a reader (e.g., reader 120 of FIG. 1 and/or 300 of FIG. 3). Method 800 begins with 802 and continues with 804 where the reader is connected to both external antenna(s) (e.g., antenna(s) 332 of FIG. 3) and human presence sensor(s) (e.g., human presence sensor(s) 334 of FIG. 3) via one cable (e.g., wire or cable 336 of FIG. 3). This is an important feature of the present solution because it simplifies the read point devices (e.g., components 300, 330 of FIG. 3) installation process and reduces the cost associated with such an installation process. Also, the overall cost of the read point devices is reduced.

In 806, power is optionally supplied from the reader to the human presence sensor via the one cable. This single cable is also used for data communications between the reader, the external antenna and the external sensor. In this regard, the reader also controls and/or programs the human presence sensor using the one cable, as shown by 808. For example, the reader programs (e.g., increases or decreases) the sensor's range of detection or field of view, and/or the sensor's communication ability to be compatible with a certain protocol (e.g., the 1-Wire protocol). The present solution is not limited in this regard.

Next in 810, the human presence sensor detects an individual's presence in proximity to the antenna(s). A signal comprising sensor information is communicated from the human presence sensor to the reader over the one cable, as shown by 812. Notably, the signal has a frequency that is outside the antenna's transmit frequency. The sensor information indicates that the individual has been detected. The sensor information may include identification information for the individual which was obtained by the human presence sensor from a mobile device being carried by or worn by the individual. The sensor information is received at the reader in 814.

In response to the reception of the sensor information, the reader's tag read operations are initiated in 816. In 818, a value for at least one RF transceiver parameter of the reader is optionally dynamically selected. This dynamic selection can be made based on various information, such as time of day, date, read point location, and/or the detected individual's identity. The RF transceiver parameter can include, but is not limited to, a transmit power parameter, a transmit frequency parameter, and a receive signal strength threshold parameter.

In 820, an interrogation signal is generated by the reader. Interrogation signals are well known in the art, and therefore will not be described herein. Still, it should be understood that the interrogation signal is intended to cause any tag (e.g., RFID tags 112, 118 of FIG. 1 and/or 200 of FIG. 1) located in proximity thereto to emit a detectable response signal. The interrogation signal is provided to the antenna(s) via the one cable. As noted above, the human presence sensor will not receive the interrogation signal sent over the one cable since this communication has a frequency which is outside the sensor's receive frequency band. In 822, the interrogation signal is emitted from the antenna(s). Thereafter, the antenna(s) receive a response signal from at least one tag. Response signals are well known in the art, and therefore will not be described herein. The response signal can include, but is not limited to, a unique tag identifier (e.g., unique identifier 224 of FIG. 2), information specifying a tag's location, item level information (e.g., information 226 of FIG. 2) for an object (e.g., object 110, 116 of FIG. 1) to which the tag is coupled, and/or motion data (e.g., motion data 228 of FIG. 2) indicating movement of the tag. The response signal is then communicated to the reader from the antenna(s) via the one cable, as shown by 826. Notably, the human presence sensor will not receive the response signal sent over the one cable since this communication has a frequency which is outside the sensor's receive frequency band. This frequency can be the same as or different than the frequency of the interrogation signal. Subsequently, 828 is performed where method 800 ends or other processing is performed (e.g., the reader performs operations to process the information contained in the response signal and/or store the same in a data store (e.g., data store 126 of FIG. 1)).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a reader, comprising:
    supplying power from the reader to an external sensor using a single cable that (A) connects the reader to both an external antenna and the external sensor and (B) is used for data communications between the reader, the external antenna and the external sensor;
    receiving, by the reader via the single cable, a sensor signal comprising information indicating the external sensor's detection of an individual's presence in proximity thereto, where the sensor signal has a frequency that is outside the antenna's transmit frequency;
    initiating tag read operations of the reader in response to the sensor information's reception at the reader; and
    communicating an interrogation signal for tag reading from the reader to the external antenna via the single cable, where the interrogation signal has a frequency which is outside the external sensor's receive frequency band.

2. The method according to claim 1, wherein the reader is 1-Wire enabled and communicates with the external sensor and the external antenna via a 1-Wire protocol.

3. The method according to claim 1, wherein the external sensor is disposed in the same housing as the external antenna.

4. The method according to claim 1, further comprising performing operations by the reader to control or program the sensor using the single cable.

5. The method according to claim 1, further comprising dynamically selecting a value for at least one transceiver parameter of the reader in response to the sensor information's reception at the reader.

6. The method according to claim 5, wherein the value is dynamically selected prior to interrogation signals communication from the reader.

7. The method according to claim 5, wherein the at least one transceiver parameter comprises a transmit power parameter, a transmit frequency parameter, and a receive signal strength threshold parameter.

8. The method according to claim 1, further comprising receiving, by the reader via the single cable, a response signal from at least one tag.

9. The method according to claim 8, wherein the response signal has a frequency which is outside the external sensor's receive frequency band.

10. The method according to claim 8, wherein the tag has at least one of a Radio Frequency Identification ("RFID") capability and an Electronic Article Surveillance ("EAS") capability.

11. A method for operating a reader, comprising:
receiving, by the reader via a single cable, a sensor signal comprising information indicating an external sensor's detection of an individual's presence in proximity thereto, where the sensor signal has a frequency that is outside the antenna's transmit frequency and the single cable that (A) connects the reader to both an external antenna and the external sensor and (B) is used for data communications between the reader, the external antenna and the external sensor;
initiating tag read operations of the reader in response to the sensor information's reception at the reader; and
communicating an interrogation signal for tag reading from the reader to the external antenna via the single cable, where the interrogation signal has a frequency which is outside the external sensor's receive frequency band.

12. A system, comprising:
a sensor;
an antenna;
a reader; and
a single cable that (A) connects the reader to both the antenna and the sensor and (B) is used for data communications between the reader, the antenna and the sensor;
wherein the reader:
supplies power to the sensor via the single cable;
receives, via the single cable, a sensor signal comprising information indicating the sensor's detection of an individual's presence in proximity to the reader, the sensor signal having a frequency that is outside the antenna's transmit frequency;
initiates tag read operations in response to the reception of the information; and
communicates an interrogation signal for tag reading to the antenna via the single cable, where the interrogation signal has a frequency which is outside the external sensor's receive frequency band.

13. The system according to claim 12, wherein the reader is 1-Wire enabled and communicates with the sensor and the antenna via a 1-Wire protocol.

14. The system according to claim 12, wherein the sensor is disposed in the same housing as the antenna.

15. The system according to claim 12, further comprising performing operations by the reader to control or program the sensor using the single cable.

16. The system according to claim 12, further comprising dynamically selecting a value for at least one transceiver parameter of the reader in response to the sensor signal's reception at the reader.

17. The system according to claim 16, wherein the value is dynamically selected prior to interrogation signals communication from the reader.

18. The system according to claim 16, wherein the at least one transceiver parameter comprises a transmit power parameter, a transmit frequency parameter, and a receive signal strength threshold parameter.

19. The system according to claim 12, wherein the reader further receives, via the single cable, a response signal from at least one tag.

20. The system according to claim 19, wherein the response signal has a frequency which is outside the external sensor's receive frequency band.

21. The system according to claim 19, wherein the tag has at least one of a Radio Frequency Identification ("RFID") capability and an Electronic Article Surveillance ("EAS") capability.

* * * * *